United States Patent
Kato et al.

(10) Patent No.: US 7,036,992 B2
(45) Date of Patent: May 2, 2006

(54) POWER ROLLER BEARING FOR TOROIDAL-TYPE CONTINUOUSLY VARIABLE TRANSMISSION

(75) Inventors: Hiroshi Kato, Kanagawa (JP); Hisashi Machida, Kanagawa (JP); Masayoshi Shimizuya, Kanagawa (JP)

(73) Assignee: NSK Ltd., Tokyo (JP)

( * ) Notice: Subject to any disclaimer, the term of this patent is extended or adjusted under 35 U.S.C. 154(b) by 230 days.

(21) Appl. No.: 10/809,430

(22) Filed: Mar. 26, 2004

(65) Prior Publication Data

US 2004/0179763 A1   Sep. 16, 2004

Related U.S. Application Data

(62) Division of application No. 10/262,833, filed on Oct. 3, 2002, now Pat. No. 6,749,343.

(30) Foreign Application Priority Data

Oct. 5, 2001   (JP)   .................. P. 2001-310175

(51) Int. Cl.
   *F16C 19/10*   (2006.01)

(52) U.S. Cl. ........................ 384/614; 476/40
(58) Field of Classification Search ............ 384/614, 384/615, 611, 612; 476/40

See application file for complete search history.

(56) References Cited

U.S. PATENT DOCUMENTS

| | | | |
|---|---|---|---|
| 5,391,126 A | 2/1995 | Fukushima et al. |
| 6,083,137 A | 7/2000 | Kato et al. |
| 6,368,245 B1 | 4/2002 | Goto et al. |

FOREIGN PATENT DOCUMENTS

| | | |
|---|---|---|
| JP | 6-16753 | 3/1994 |
| JP | 9-42403 | 2/1997 |
| JP | 10-141462 | 5/1998 |
| JP | 10-246301 | 9/1998 |
| JP | 11-118011 | 4/1999 |
| JP | 2000-220711 | 8/2000 |
| JP | 2001-4003 | 1/2001 |
| JP | 2001-50360 | 2/2001 |
| JP | 2001-187951 | 7/2001 |
| JP | 2001-193813 | 7/2001 |
| JP | 2001-254792 | 9/2001 |
| JP | 2002-70974 | 3/2002 |

*Primary Examiner*—Lenard A. Footland
(74) *Attorney, Agent, or Firm*—Sughrue Mion, PLLC (57) ABSTRACT

A power roller bearing for rotatably supporting a power roller of a toroidal-type continuously variable transmission, having: an inner ring; an outer ring; a plurality of balls respectively interposed between the inner and outer rings; and, a retainer for holding the balls therein, wherein the retainer includes a plurality of pockets for storing the balls therein at equi-distant positions in the peripheral direction of the retainer, and the inner peripheral portions of the pockets are respectively formed of elastic material that, when the power roller rotates, allows the balls to shift from the equi-distant positions.

2 Claims, 7 Drawing Sheets

POWER ROLLER BEARING FOR TOROIDAL-TYPE CONTINUOUSLY VARIABLE TRANSMISSION

This is a divisional of Application Ser. No. 10/262,833 filed Oct. 3, 2002 now U.S. Pat. No. 6,749,343; the disclosure of which is incorporated herein by reference.

BACKGROUND OF THE INVENTION

The present invention relates to a power roller bearing for a toroidal-type continuously variable transmission for use, for example, in a power transmission system of a vehicle.

Figure 9:
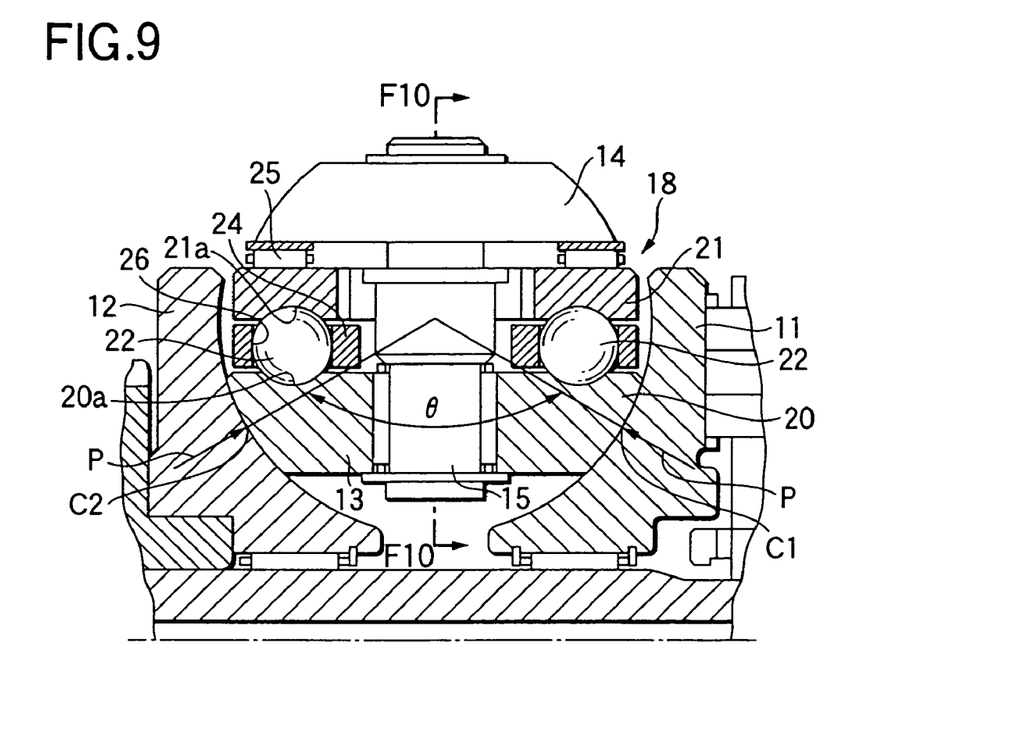
FIG. 9 is a section view of a portion of a conventional toroidal-type continuously variable transmission.
Figure 10:
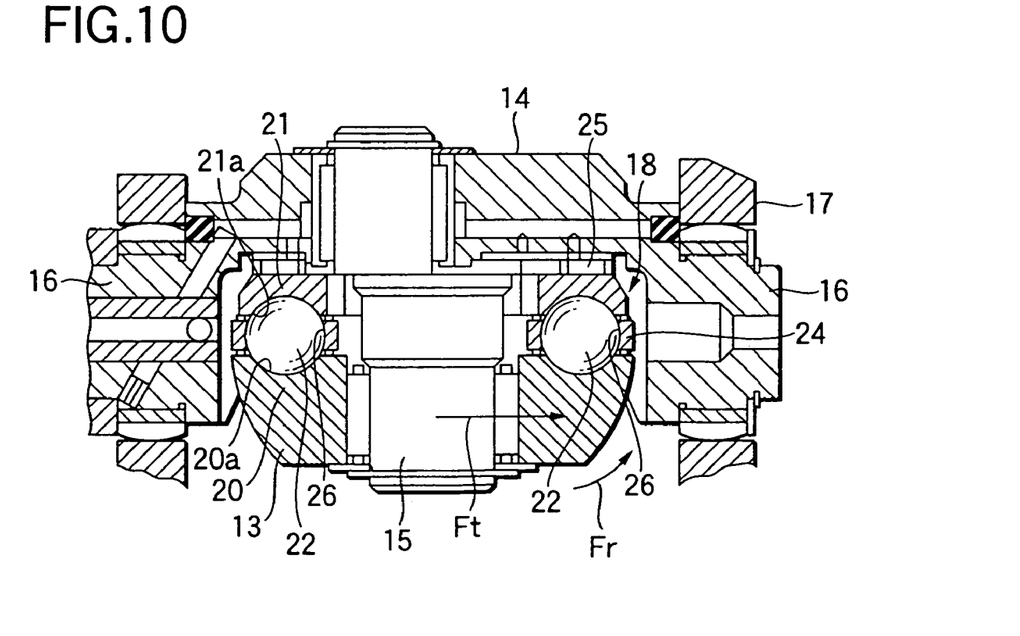
FIG. 10 is a section view taken along the line F10—F10 shown in FIG. 9.

A half-toroidal-type continuously variable transmission, as shown partially in FIGS. 9 and 10, comprises a power roller 13 between an input disk 11 and an output disk 12. The power roller 13 rotates about a displacement shaft 15 which is disposed on a trunnion 14. The trunnion 14 is supported by a pair of trunnion shafts 16 so as to be swung with respect to a support body 17. Between the trunnion 14 and power roller 13, there is interposed a power roller bearing 18.

The power roller bearing 18 comprises an inner ring 20 composed of a portion of the power roller 13, an outer ring 21 disposed to be opposed to the inner ring 20, a plurality of balls 22 respectively interposed between a raceway 21a formed in the outer ring 21 and a raceway 20a formed in the inner ring 20, a ring-shaped retainer 24 for holding the respective balls 22 in a freely rotatable manner, and a thrust bearing 25 interposed between the outer ring 21 and trunnion 14. The respective balls 22 are rotatably stored in their associated pockets 26 formed in the retainer 24. These pockets 26 are disposed at an equal pitch, that is, at equally distant (equi-distant) positions in the peripheral direction of the retainer 24.

When the toroidal-type continuously variable transmission is in operation, as shown in FIG. 9, the power roller bearing 18 and disks 11, 12 are contacted with each other at two contact points C1, C2, thereby providing a so called two-point pressing state. In FIG. 9, θ designates the contact angle. Therefore, the power roller bearing 18 receives the thrust component of a pressing force P at the contact points C1, C2 and, at the same time, it generates the radial-direction component at the mutually 180° opposed position on the circumference of the power roller 13. Thus, the circular-ring-shaped power roller bearing 18 is compressed in the radial direction and, due to this compression force, the inner ring 20 tends to deform into an elliptical shape.

As a result of this, the load distribution on the circumference of the power roller 13 is caused to vary. The balls 22 rotate at high speeds while they are receiving such variable loads and, therefore, the rolling portions of the balls 22 generate a lot of heat. That is, the power roller bearing 18 is used under the severer conditions than an ordinary bearing.

Figure 11:
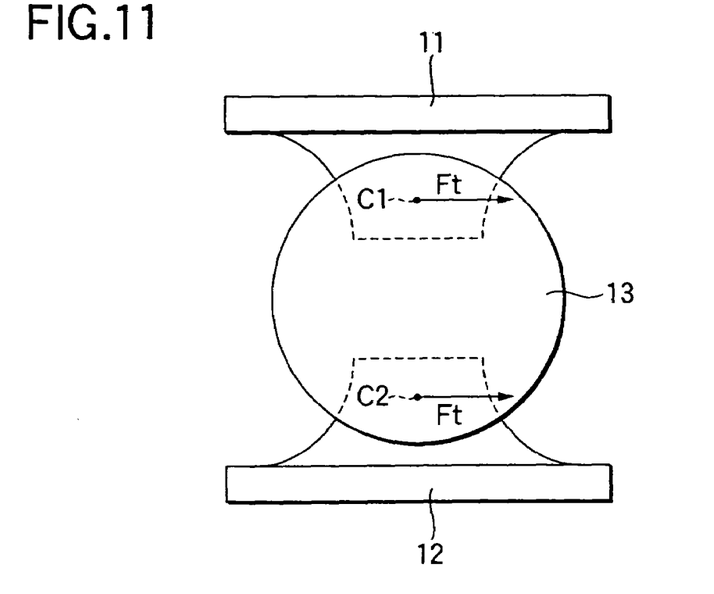
FIG. 11 is a typical plan view to show the position relationship between disks and power roller.

Also, when the toroidal-type continuously variable transmission is in operation, at the traction contact points C1, C2 for transmission of power between the power roller 13 and the respective disks 11, 12, there are generated such tangential-direction forces Ft as shown in FIGS. 10 and 11. A force 2Ft, which is the sum of two forces Ft respectively generated at the two contact points C1, C2, provides a force Fr (which is shown in FIG. 10) going in a direction to fall down the power roller bearing 18, thereby causing the above-mentioned compression force to unbalance in magnitude.

Figure 12:
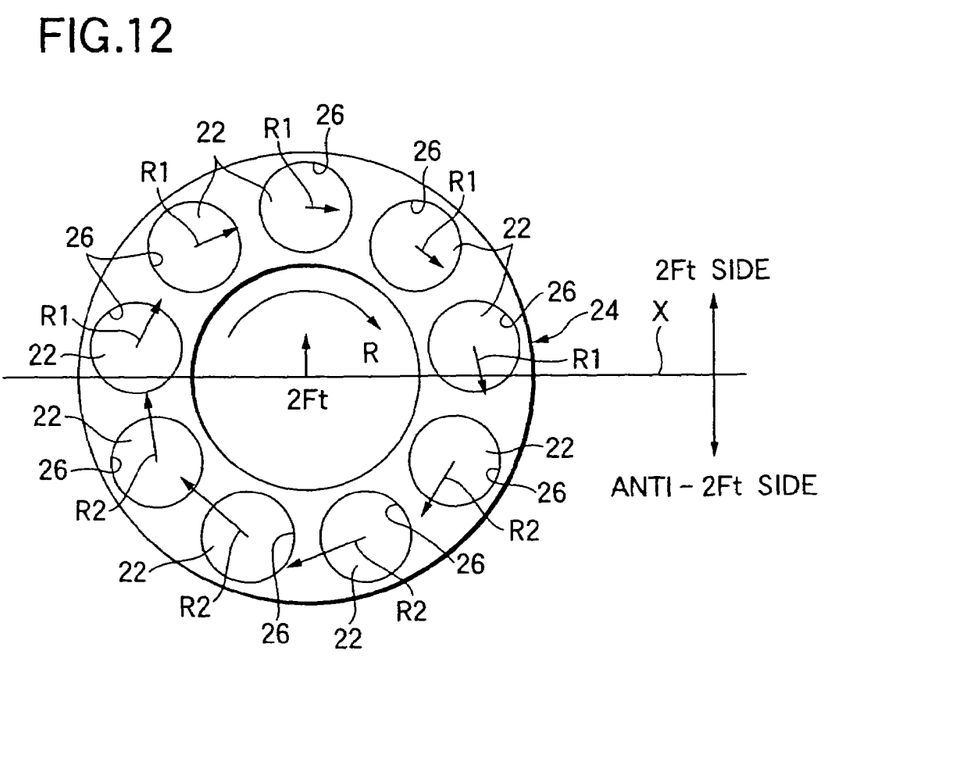
FIG. 12 is a plan view of a retainer and balls included in a power roller bearing, showing the magnitude and direction of the orbital speed of the balls with respect to the rotation of the retainer.

The orbital speed of the balls 22 of the power roller bearing 18 used under the above conditions provide such distribution as shown by arrow marks in FIG. 12. That is, in case where the rotation direction of the retainer 24 is shown by the arrow mark R, the orbital speeds R1 of the respective balls 22 situated on the 2Ft side are slower than the orbital speeds R2 of the balls 22 situated on the anti-2Ft side.

Figure 13:
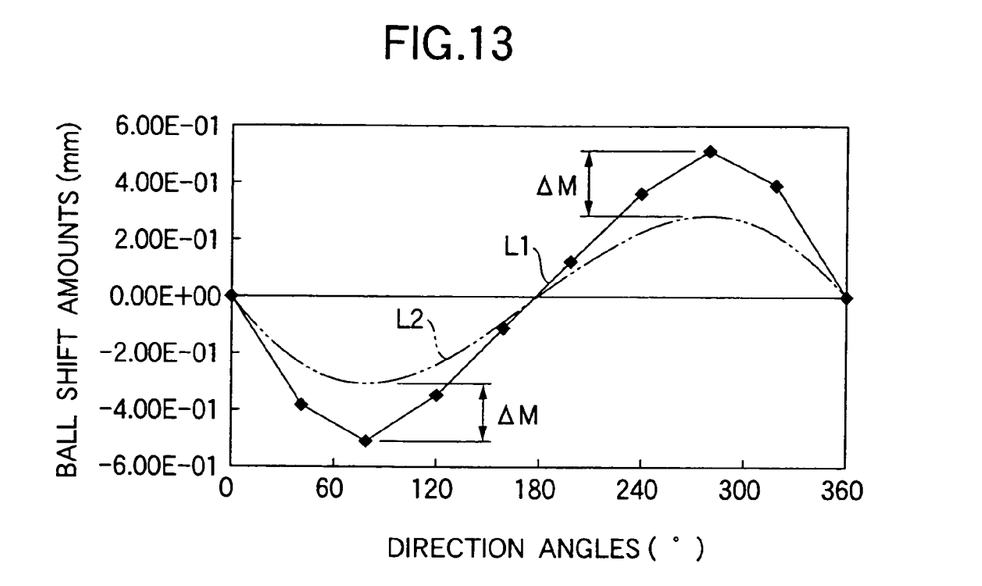
FIG. 13 is a graphical representation of the relationship between the direction angles and shifting amounts of the balls in the power roller bearing shown in FIG. 12; and, FIG. 14 is a graphical representation of the magnitude and direction of contact load of the balls in the power roller bearing shown in FIG. 12.
Figure 14:
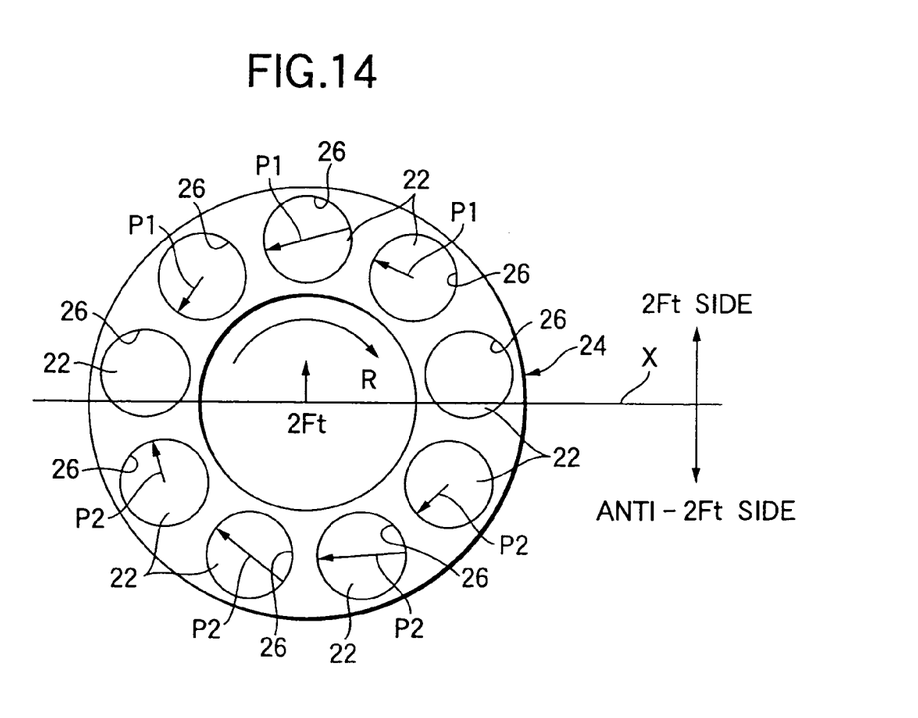

In this manner, when the power roller 13 rotates, since there are produced orbital speed differences between the respective balls 22, as shown by the line L1 in FIG. 13, the balls 22 are going to roll in such a manner that they are shifted from the above-mentioned their respective equi-distant positions. However, in fact, because the movements of the balls 22 are restricted by the retainer 24, as shown in FIG. 14, the contact loads between the balls 22 and retainer 24 vary according to the positions of the balls 22.

That is, the contact loads P2 of the balls 22 situated on the anti-2Ft side act on the balls 22 so as to push the retainer 24 in the rotation direction R. On the other hand, the contact loads P1 of the balls 22 situated on the 2Ft side act on the balls 22 so as to push the retainer 24 in the opposite direction to the rotation direction R. Due to this, the inner peripheral surfaces of the pockets 26 of the retainer 24 and balls 22 are contacted with each other, which results in the lowered durability of the retainer 24.

Also, when the balls 22 are contacted with the retainer 24, they receive a reactive force from the retainer 24. Due to this, the actual shifting amounts of the balls 22, as shown by the line L2 in FIG. 13, become smaller by a $\Delta M$ than their ideal shifting amounts (line L1). That is, the respective balls 22 are caused to slide on the rolling surface by the amount of $\Delta M$, which reduces the efficiency of the toroidal-type continuously variable transmission.

In JP-A-2001-4003, there is disclosed a technique in which, in order to reduce phase differences to be generated between balls, pockets are made slightly longer in the peripheral direction of a retainer (that is, the pockets are respectively formed as elongated pockets) to thereby widen a clearance between the balls and the inner peripheral surfaces of the pockets. According to this conventional technique, in a high load area, the balls are able to shift in the longitudinal direction of the pockets and, therefore, the orbital speed differences of the balls can be absorbed. However, in a low load area, since the phase differences between the balls are small, the balls tend to stay in the vicinity of the centers of the pockets; and, because the above-mentioned clearance is relatively large, there is a possibility that the retainer can be vibrated in the peripheral direction thereof.

SUMMARY OF THE INVENTION

In view of the above circumstances of the related art, it is an object of the invention to provide a power roller bearing which can restrict the slippage between balls and rolling surfaces to thereby be able to prevent the efficiency of the power roller bearing from being lowered.

In attaining the above object, according to the invention, there is provided a power roller bearing for rotatably supporting a power roller of a toroidal-type continuously variable transmission, comprising: an inner ring; an outer ring; a plurality of balls interposed between the inner and outer rings; and, a retainer for holding the balls therein, wherein the retainer includes a plurality of pockets for storing the balls therein at equi-distant positions in the peripheral direction of the retainer, and the inner peripheral portions of the pockets are respectively formed of such elastic material that, when the power roller rotates, allows the balls to shift from the equi-distant positions.

According to the above construction of the invention, it is preferable that the inside diameter of each of the pockets is larger than the outside diameter of each of the balls, the inside diameter of the opening of the pocket is smaller than the outside diameter of the ball, and the opening has such elasticity that allows the opening to spread out to a size equal to or larger than the outside diameter of the ball.

Since, when the power roller rotates, for the above-mentioned reason, there are produced the orbital speed differences between the balls, the balls are going to roll shifted from their respective equi-distant positions. The retainer, which is used in the power roller bearing according to the invention, due to its elasticity, allows the balls to roll shifted from their respective equi-distant positions. Thus, the reactive forces, which are given to the balls from the retainer when they are contacted with each other, are small. Therefore, the shifting amounts of the balls can be made to approach the ideal shifting amounts, thereby being able to restrict slippage between the balls and rolling surfaces.

In the present invention, preferably, the inside diameter of each of the pockets may be larger than the outside diameter of each of the balls, the inside diameter of the opening of each pocket may be smaller than the outside diameter of each ball, and the retainer may have such elasticity that allows the opening to spread more than the outside diameter of the ball. In this case, the balls can be easily inserted into their associated pockets. This makes it possible to prevent the balls incorporated into the retainer from slipping out of the retainer.

Also, according to the invention, there is provided a power roller bearing for rotatably supporting a power roller of a toroidal-type continuously variable transmission, comprising: an inner ring; an outer ring; a plurality of balls interposed between the inner and outer rings; and, a retainer for holding the balls therein, wherein the retainer includes a plurality of pockets for storing the balls there in at equi-distant positions in the peripheral direction of the retainer and, in the inner peripheral portion of each of the pockets, there are disposed a pair of suspension mechanisms which, when the power roller rotates, allow the balls to shift from the equi-distant positions.

According to the above construction of the invention, it is preferable that a pair of suspension mechanisms are disposed in the interior of their associated pocket so as to be opposed to each other with their associated ball between them.

According to the above construction of the invention, it is preferable that each of the balls can be inserted into and removed from the associated pocket and, in a state where the associated ball is inserted in the associated pocket, the ball is held by the pair of suspension mechanisms.

In a preferred embodiment of the invention, in the interior of each of the pockets, there are disposed a pair of suspension mechanisms which are opposed to each other with their associated ball between them. Also, in this preferred embodiment of the invention, the balls to be inserted into their respective pockets can be inserted into and removed from such pockets; and, in a state where the balls are respectively inserted into the pockets, the balls are held by their respective suspension mechanisms.

DETAILED DESCRIPTION OF THE PREFERRED EMBODIMENTS

Now, description will be given below of a power roller bearing 18A according to a first embodiment of the invention with reference to FIGS. 1 to 4.

Figure 1:
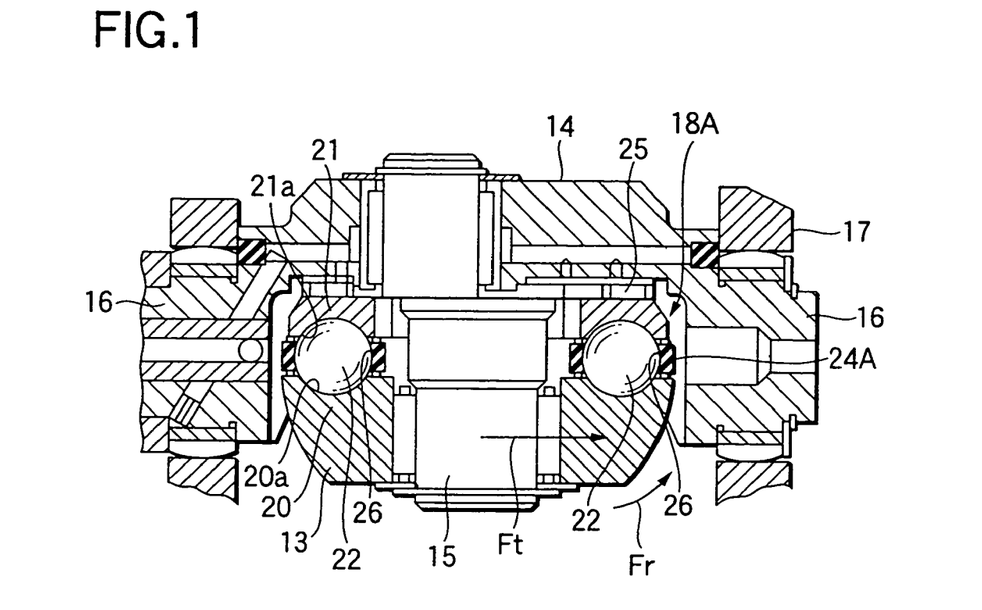
FIG. 1 is a section view of a portion of a half-toroidal-type continuously variable transmission including a power roller bearing according to a first embodiment of the invention.
Figure 2:
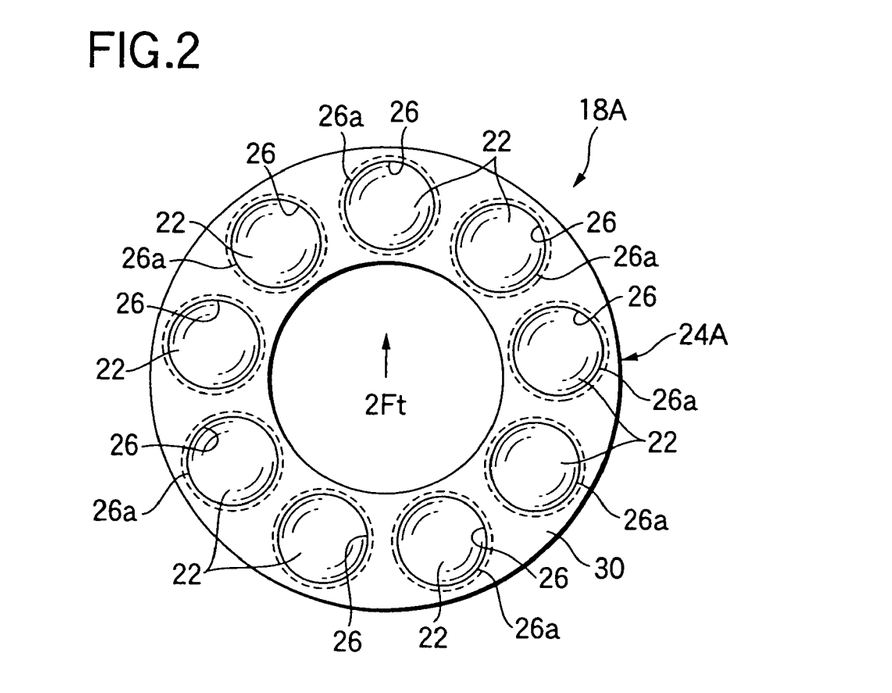
FIG. 2 is a plan view of a retainer included in the power roller bearing shown in FIG. 1, showing a state thereof in which balls are incorporated in the retainer.

As shown in FIG. 1, between a power roller 13 and a trunnion 14, there is interposed a power roller bearing 18A. The power roller 13, as in the half-toroidal-type continuously variable transmission shown in FIG. 9, is interposed between an input disk and an output disk. The power roller 13 rotates about a displacement shaft 15 disposed on the trunnion 14. The trunnion 14 is supported by a pair of trunnion shafts 16 so as to be swung with respect to a support body 17.

The power roller bearing 18A comprises an inner ring 20 composed of a portion of the power roller 13, an outer ring 21 disposed to be opposed to the inner ring 20, a plurality of balls 22 respectively stored between a raceway 21a formed in the outer ring 21 and a raceway 20a formed in the inner ring 20, a ring-shaped retainer 24A for holding the balls 22 so as to be able to rotate, and a thrust bearing 25 interposed between the outer ring 21 and trunnion 14. The respective balls 22 are rotatably stored in their associated pockets 26 formed in the retainer 24A. These pockets 26 are formed at an equal pitch, that is, at equi-distant positions in the peripheral direction of the retainer 24A.

When the power roller 13 rotates, for the above-mentioned reason, the balls are going to rotate in such a manner that they are shifted from their respective equi-distant positions in accordance with the orbital speed differences between the balls 22. The retainer 24A is formed of such elastic material 30 that allows the balls 22 to rotate shifted from their respective equi-distant positions. As the elastic material 30, there can be used elastomer formed of synthetic resin having rubber-like elasticity or sponge (porous elastomer) and synthetic rubber. The term "elastic material 30" used in the present specification means material which can flex in the thickness direction thereof and the deforming area (elastic area) of which, within the elastic limit, is larger than metal such as brass.

In the toroidal-type continuously variable transmission, there is used special traction oil for the purpose of power transmission. Due to this, as the elastic material 30 forming the retainer 24A, there may be recommended such material that does not substantially react with the base oil (such as mineral oil, or synthetic oil) of the traction oil; for example, fluorine-system resin or Teflon-system resin.

Figures 3, 4A, 4B:
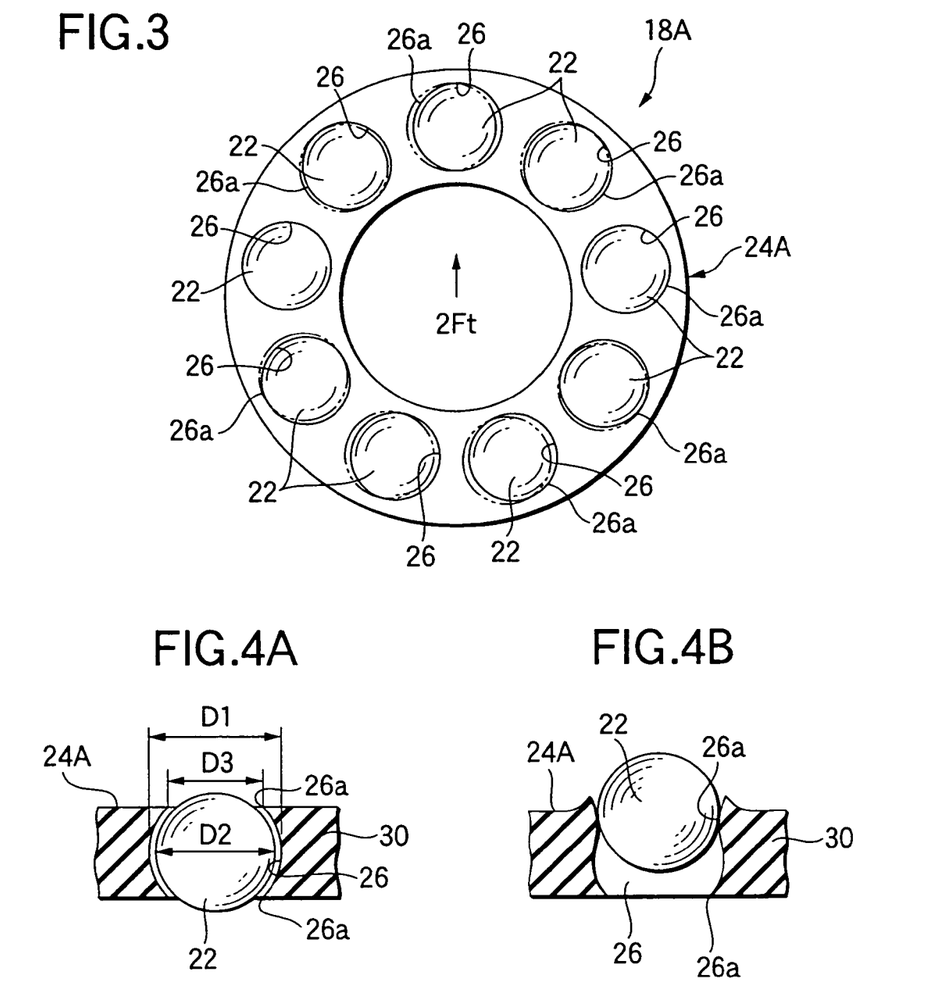
FIG. 3 is a typical plan view of the above retainer, showing by two-dot chained lines a state in which the balls of the power roller bearing shown in FIG. 2 are shifted from their respective equi-distant positions.
FIG. 4A is a section view of a portion of the power roller bearing shown in FIG. 1.
FIG. 4B is a section view of the present portion, showing a state thereof in which a ball is inserted into a pocket.

As shown in FIG. 4A, the inside diameter D1 of the pocket 26 is larger than the outside diameter D2 of the ball 22. The inside diameter D3 of the opening 26a of the pocket 26 is smaller than the outside diameter D2 of the ball 22. As shown in FIG. 4B, the retainer 24A has such elasticity as allows the opening 26a of the pocket 26 to spread up to a size equal to or larger than the outside diameter D2 of the ball 22. Thanks to this elasticity, the ball 22 can be inserted into the pocket 26, and also the ball 22 inserted into the pocket 26 can be taken out of the pocket 26.

Since the retainer 24A has such elasticity, when assembling the power roller bearing 18A, the balls 22 can be inserted into their associated pockets 26 easily. And, the retainer 24A itself is able to prevent the inserted balls 22 from slipping out of the pockets 26. Therefore, there is eliminated the need to caulk a portion of the retainer after the balls are inserted into their respective pockets, which has been conventionally executed in the case of a metal-made retainer. This can simplify the assembling process of the power roller bearing and thus can reduce the cost of the power roller bearing.

In the power roller bearing 18A, when the power roller 13 rotates, for the above-mentioned reason, in accordance with the orbital speed differences between the balls 22, the balls 22 are going to roll at positions shifted from their respective equi-distant positions in a direction along the raceways 20a, 21a. When the balls 22 are going to roll at positions shifted from their respective equi-distant positions, the pockets 26 of the retainer 24A having elasticity are allowed to shift together with the balls 22 in such a manner as shown exaggeratedly by two-dot chained lines in FIG. 3.

This allows the balls 22 to shift in position, whereby the balls 22 roll on their respective rolling surfaces with such ideal shift amounts (line L1) shown in FIG. 13. This can reduce slippage between the balls 22 and rolling surfaces (raceways 20a, 21a), thereby being able to enhance the efficiency and durability of the toroidal-type continuously variable transmission.

Figure 5:
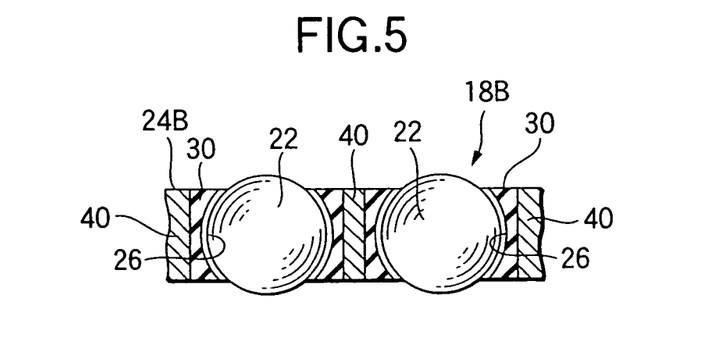
FIG. 5 is a section view of a portion of a power roller bearing according to a second embodiment of the invention.

Now, FIG. 5 shows a portion of a power roller bearing 18B according to a second embodiment of the invention. In the case of the present power roller bearing 18B, a retainer 24B includes an elastic material 30 forming the inner peripheral portion of a pocket 26 and a frame member 40 made of high-rigidity material such as metal. In case where a large force is applied to a retainer as in a toroidal-type continuously variable transmission which provides a high output, such a combination of the elastic material 30 and frame member 40 as in the present embodiment can enhance the strength of the retainer 24B.

By the way, in the above-mentioned power roller bearings 18A, 18B, in case where there is formed an oil groove which communicates with the pocket 26, supply of the lubricating oil (traction oil) to the pocket 26 can be facilitated.

Figure 6:
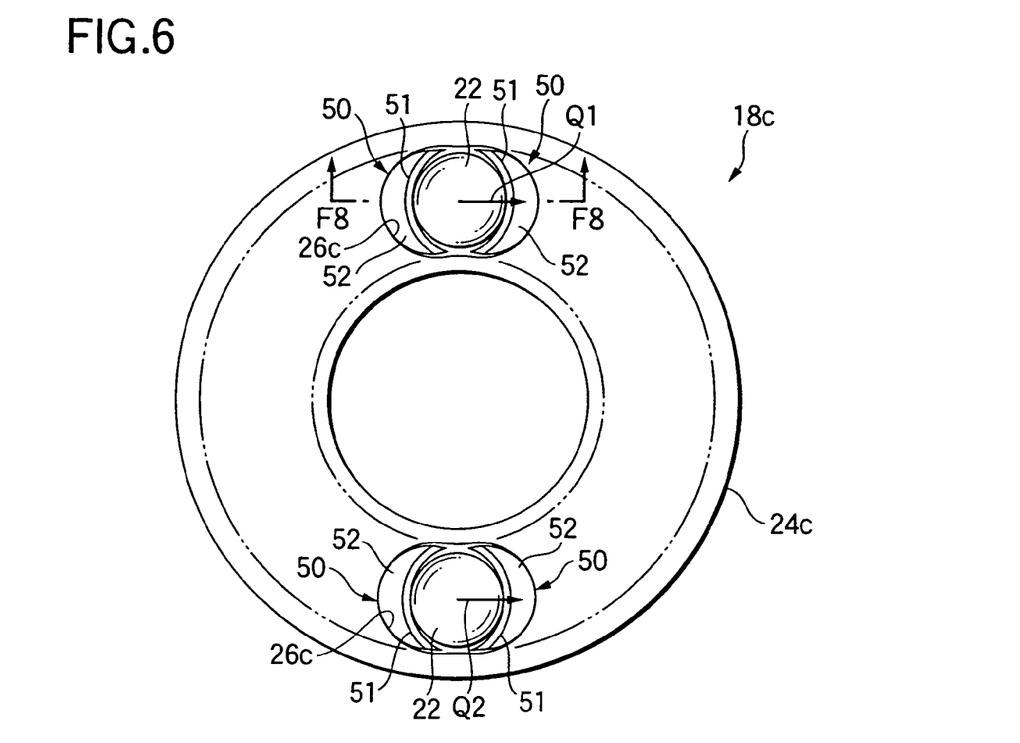
FIG. 6 is a partially omitted plan view of a power roller bearing according to a third embodiment of the invention.

Now, FIG. 6 shows a portion of a power roller bearing 18C according to a third embodiment of the invention. In the present power roller bearing 18C, a plurality of pockets 26C are formed at equi-distant positions in the peripheral direction of a retainer 24C. By the way, in FIG. 6, as the representatives of these pockets 26C, there are shown only the two pockets 26C formed at two positions which are disposed to be opposed by 180° to each other. Each of the pockets 26C is an elongated hole which is slightly longer in the peripheral direction of the retainer 24C. In the interior of each pocket 26C, there are disposed a pair of suspension mechanisms 50 which are opposed to each other with a ball 22 between them.

Figure 7:
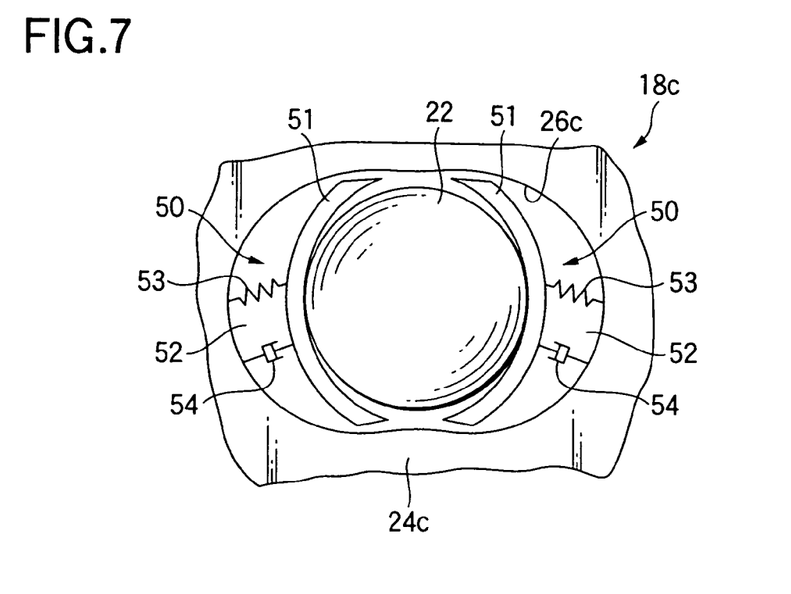
FIG. 7 is a partially enlarged typical plan view of a portion of the power roller bearing shown in FIG. 6.

Each of the suspension mechanisms 50 includes a member 51 to be contacted with the ball 22 and an elastic member 52 for energizing the member 51 toward the ball 22. As typically shown in FIG. 7, the elastic member 52 has not only the function of a spring 53 but also the function of a damper 54. By the way, in the present embodiment, the suspension mechanisms 50 are disposed in the peripheral direction of the retainer 24C; however, even in case where the suspension mechanisms 50 are disposed in the diameter direction of the retainer 24C, the suspension mechanisms 50 are able to perform similar functions.

In case where the elastic member 52 is made of rubber or a sponge, the suspension mechanism 50 can be made light in weight and easy to handle. As the material of the elastic member 52, preferably, there may be used high molecular material such as fluorine-system material or Teflon-system material which is compatible with the traction oil.

The member 51 to be contacted with the ball 22, preferably, may be formed of wear-resistant material. In case where the whole of the retainer 24C is formed of wear-resistant material, it is difficult to machine the retainer 24C. However, in case where only the member 51 to be contacted with the ball 22 is formed of wear-resistant material, it is possible to facilitate the machining of the retainer 24C.

In the present power roller bearing 18C, due to the above-mentioned orbital speed differences between the balls 22, the balls 22 are allowed to move in directions shown by the arrow marks Q1, Q2 in FIG. 6. The movements of the balls 22 due to the orbital speed differences are absorbed by the suspension mechanisms 50.

Figure 8:
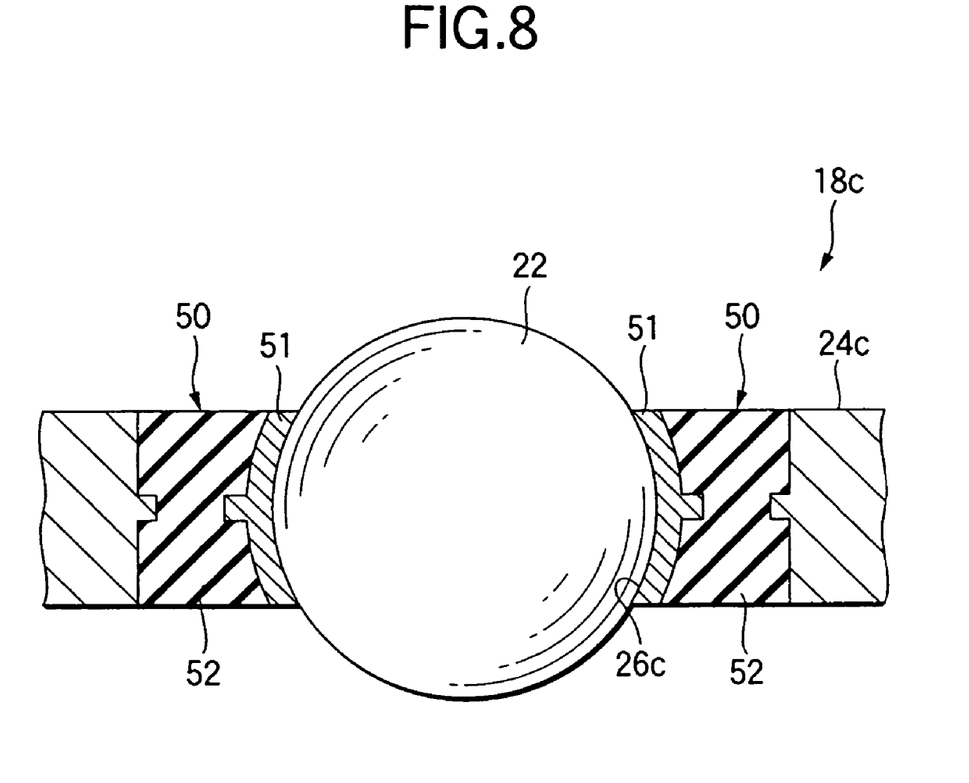
FIG. 8 is a section view taken along the line F8—F8 shown in FIG. 6.

As shown in FIG. 8, in the suspension mechanism 50, a pair of members 51 to be contacted with the ball 22 are structured so as to be able to embrace the ball 22 between them and, therefore, the ball 22 can be inserted inside the pair of members 51 and also can be taken out of them. That is, in a state where the ball 22 is inserted into the pocket 26, the ball 22 is held by the suspension mechanisms 50. Employment of the thus structured suspension mechanisms 50 not only can enhance the assembling efficiency of the power roller bearing 18C but also can omit the caulking step to thereby reduce the cost of the power roller bearing 18C.

By the way, in enforcing the invention, of course, the composing elements of the invention, such as the inner ring and outer ring forming the power roller bearing, the shape of the retainer including the pockets, and the concrete examples of the elastic materials can be changed variously without departing from the gist of the invention.

According to the invention, when the power roller rotates, even in case where there are generated orbital speed differences between the respective balls held by the retainer, the respective balls are allowed to roll at positions shifted from their respective equi-distant positions. This can restrict slippage between the balls and rolling surfaces, which in turn can prevent the efficiency of the toroidal-type continuously variable transmission from being lowered. Also, when compared with the conventional metal-made retainer, the reactive forces that are given to the balls from the present retainer when they are contacted with each other are small and also the contact loads are small, thereby being able to restrict the wear of the retainer and balls.

Also, according to the invention, when assembling the power roller bearing, the balls can be easily inserted into their associated pockets, while the retainer itself is able to prevent the inserted balls from slipping out of the pockets. According to the invention, there is eliminated the need for execution of time-and-labor taking machining operation, such as an operation to caulk a portion of the retainer after the balls are inserted into the pockets, which makes it possible to simplify the assembling process of the power roller bearing.

Further, according to the invention, in the high load area, the orbital speed differences between the balls can be absorbed; and, in the low load area, there can be restricted the vibrations of the retainer that are caused by clearances existing between the balls and pockets.

What is claimed is:

1. A power roller bearing for rotatably supporting a power roller of a toroidal-type continuously variable transmission, comprising:

an inner ring;

an outer ring;

a plurality of balls respectively interposed between the inner and outer rings; and, a retainer for holding the balls therein, wherein the retainer includes a plurality of pockets for storing the balls therein at equi-distant positions in the peripheral direction of the retainer, and the inner peripheral portions of the pockets are respectively formed of elastic material that, when the power roller rotates, allows the balls to shift from the equi-distant positions.

2. The power roller bearing as set forth in claim 1, wherein the inside diameter of each of the pockets is larger than the outside diameter of each of the balls, the inside diameter of the opening of the pocket is smaller than the outside diameter of the ball, and the opening has such elasticity that allows the opening to spread out to a size equal to or larger than the outside diameter of the ball.

* * * * *